Figure 1:
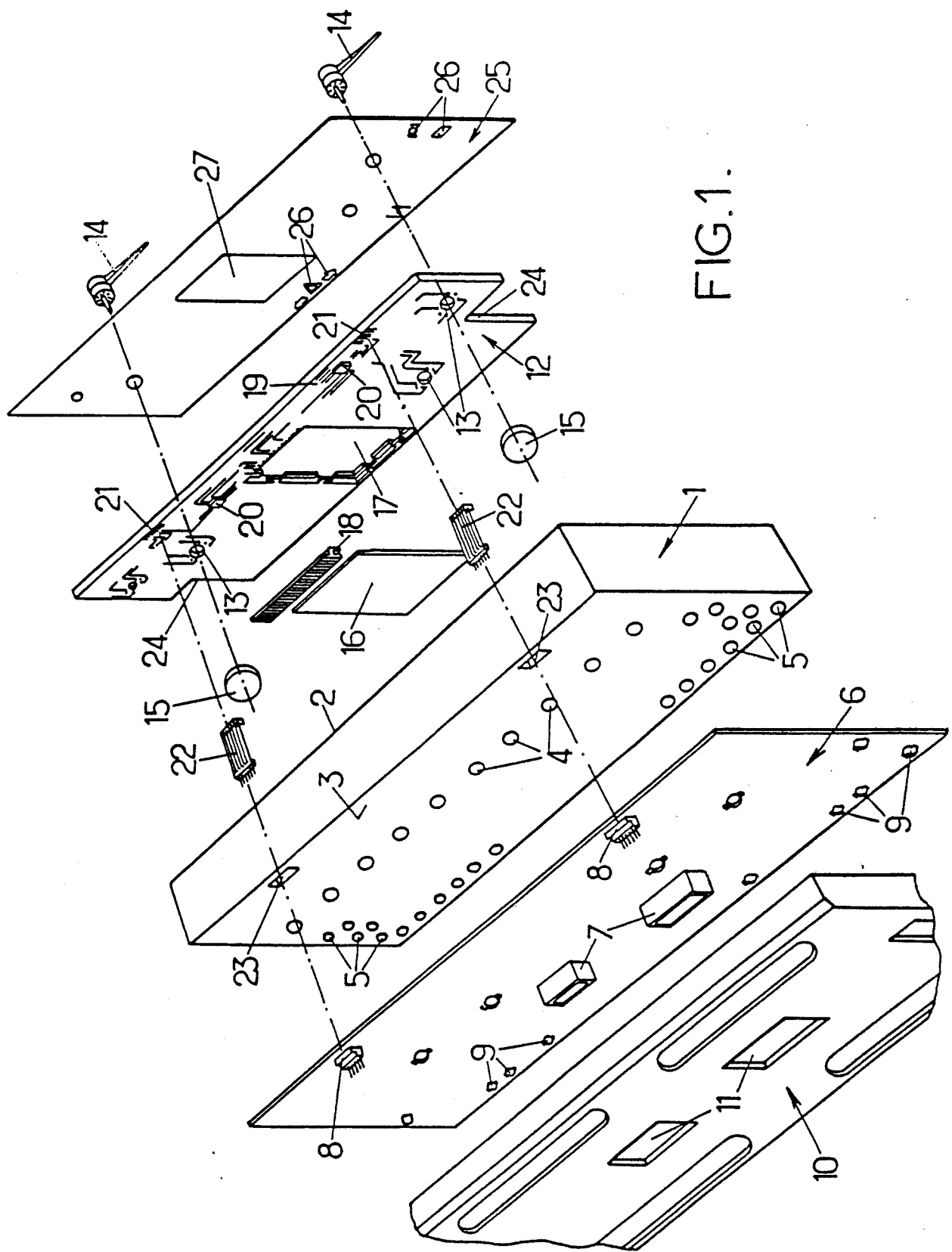

United States Patent [19]

Fournier

[11] Patent Number: 5,003,433
[45] Date of Patent: Mar. 26, 1991

[54] DASHBOARD OR DASHBOARD PORTION LAY-OUT, PARTICULARLY FOR MOTOR VEHICLES

[75] Inventor: Joel Fournier, Cergy, France

[73] Assignee: Societe D'Applications Generales D'Electricite et de Mecanique Sagem, Paris, France

[21] Appl. No.: 303,227

[22] Filed: Jan. 30, 1989

[30] Foreign Application Priority Data

Feb. 1, 1988 [FR] France ................. 88 01112

[51] Int. Cl.⁵ ............................................. G01D 11/28
[52] U.S. Cl. ...................................... 362/29; 116/286; 362/61
[58] Field of Search ............ 362/23, 29, 30, 61; 73/499; 116/286, 287, 288

[56] References Cited

U.S. PATENT DOCUMENTS

| | | | |
|---|---|---|---|
| 3,137,082 | 6/1964 | Phlieger, Jr. ................. | 362/29 X |
| 4,177,497 | 12/1979 | McCook et al. ............. | 362/29 X |
| 4,216,524 | 8/1980 | Leverauc ..................... | 362/23 X |
| 4,355,347 | 10/1982 | Guthrie ........................ | 362/29 X |
| 4,431,966 | 2/1984 | Pucciarello ................... | 362/29 X |
| 4,507,706 | 3/1985 | Trexler, Jr. ................... | 362/29 X |
| 4,878,387 | 11/1989 | Muramatsu ................... | 362/30 X |

Primary Examiner—Stephen F. Husar
Assistant Examiner—Peggy A. Neils
Attorney, Agent, or Firm—Larson and Taylor

[57] ABSTRACT

A dashboard lay-out is provided, particularly for motor vehicles, comprising: a central case (1) with its front face (2) open and arranged inside so as to form a light box diffusing an homogeneous light towards the front; a rear plate (6) fixed to the rear face (3) of the case and supporting the components of the dashboard not situated on the front face; a transparent front plate (12) fixed to the front face (2) of the case and supporting the components (14, 16) to be seen by an observer as well as their direct control devices (15, 20) as required; and a facing plate (25) with selective transparency having zones of different colours covering the front plate; connection means, particularly electric connection means (22, 28), providing the necessary connections between the rear and front plates.

10 Claims, 3 Drawing Sheets

DASHBOARD OR DASHBOARD PORTION LAY-OUT, PARTICULARLY FOR MOTOR VEHICLES

The present invention relates to improvements to dashboards or dashboard portions, particularly for motor vehicles.

Dashboards are adapted so as to give ever more numerous indications, particularly visual indications, concerning the operating condition of the vehicles, and in particular motor vehicles. The electric connections for the indicating apparatus and the different indicator lights require the presence of a multitude of electric wires which clutter up the inside of the dashboards. This results in making maintenance very difficult.

In addition, the different indicator apparatus, generally of the pointer type, are bulky and cumbersome; some parts (such as the front face) have only a decorative and non functional role; lighting is provided by lamps which it is often difficult to house and which further add to the general overcrowding without their efficiency being always as perfect as might be desired.

Finally, a modification of the appearance of the dashboard often leads to its complete remaking, which results in long and expensive design and development studies.

The purpose of the invention is essentially to overcome these drawbacks and to provide an improved dashboard, designed in unitary form, which is easy to fit and maintain, which is efficient, and which lends itself and at a lower cost to modifications of appearance.

To these ends, a dashboard lay-out in accordance with the invention is characterized in that it comprises:

a central case a large face of which, turned towards the front, is open and the inside of which is adapted so as to form a light box for diffusing towards the front an homogeneously distributed light, a rear plate, fixed on the main rear face of the central case, and supporting the components of the dashboard not situated on the front face, a front plate fixed to the main front open face of the central case, and supporting the components to be seen by an observer as well as, if required, their direct control devices, this front plate being transparent, and a facing plate covering the front plate, this facing plate having selective transparency with zones of different colours, connection means, particularly electric connection means, being provided for the necessary connections between the rear plate and the front plate.

Advantageously, the rear plate is in the form of a printed circuit board.

To improve the protection and increase the rigidity of the assembly, a rear protection cover may be provided, which covers the rear plate and is fixed to the central case.

Desirably, the lighting lamps for the dashboard are supported by the rear plate, corresponding openings being formed in the rear face of the central case so that the active portion of said lamps is situated in the light box.

Also desirably, lamps for warning and/or signalling functions are supported by the rear plate opposite zones of the central case which are outside the light box, particularly on the edges and/or in the corners of the central case, and the central case is further adapted so that the light emitted by the warning and/or function signalling lamps is transmitted as far as the facing plate without interfering with each other and without interfering with the general lighting delivered by the light box.

Preferably, the transparent front plate is provided with printed circuits on its rear face.

To give maximum passage for the light, it is advantageous, with the dashboard equipped with pointer indicator apparatus (rev counter, speedometer, petrol gauge, etc . . . ) for the pointers to be driven by stepper electric motors which are of a smaller size than traditional galvanometric motors.

In a desire for simplicity and reduction of manufacturing costs, the selective transparency facing plate with zones of different colours is silk-screen printed.

The connection means between the rear plate and the front plate may also comprise electric connectors passing through the central case, or else these connection means may comprise a flexible printed track film having at least two clamped end zones applied respectively against the rear plate and against the front plate, this flexible printed track film being further able itself to support certain components, more particularly electric or electronic components.

With the arrangements of the invention, a dashboard or dashboard portion is obtained which is easy to manufacture using techniques currently used in the field of electric and electronic construction (printed circuits), in which the discrete wiring is considerably reduced, which gives more efficient lighting, which is easier to assemble while being easier to maintain and which finally lends itself readily to modifications of appearance by arrangements concerning a reduced number of parts without the overall structure being involved as a whole.

Figure 2:
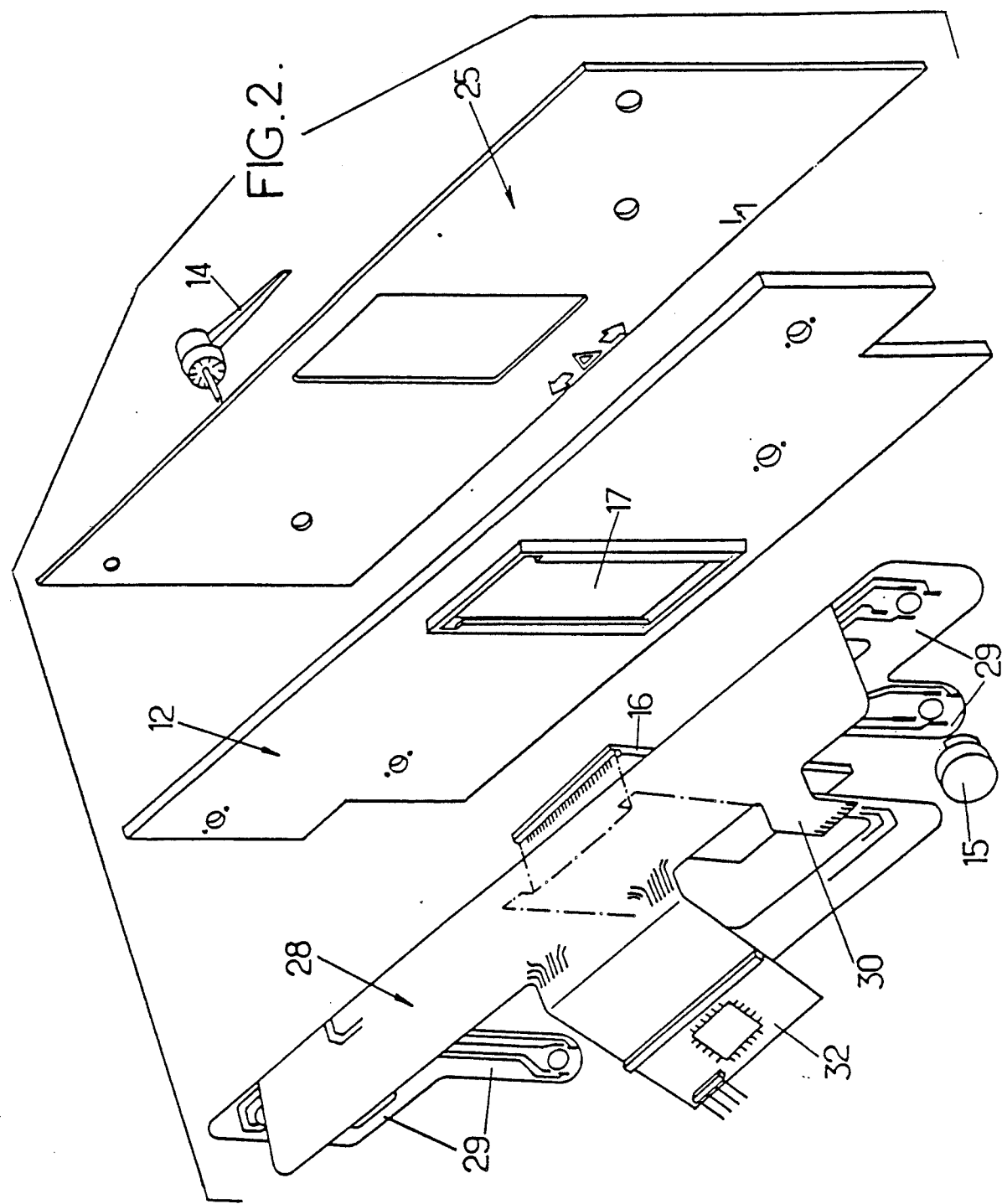
Figure 3:
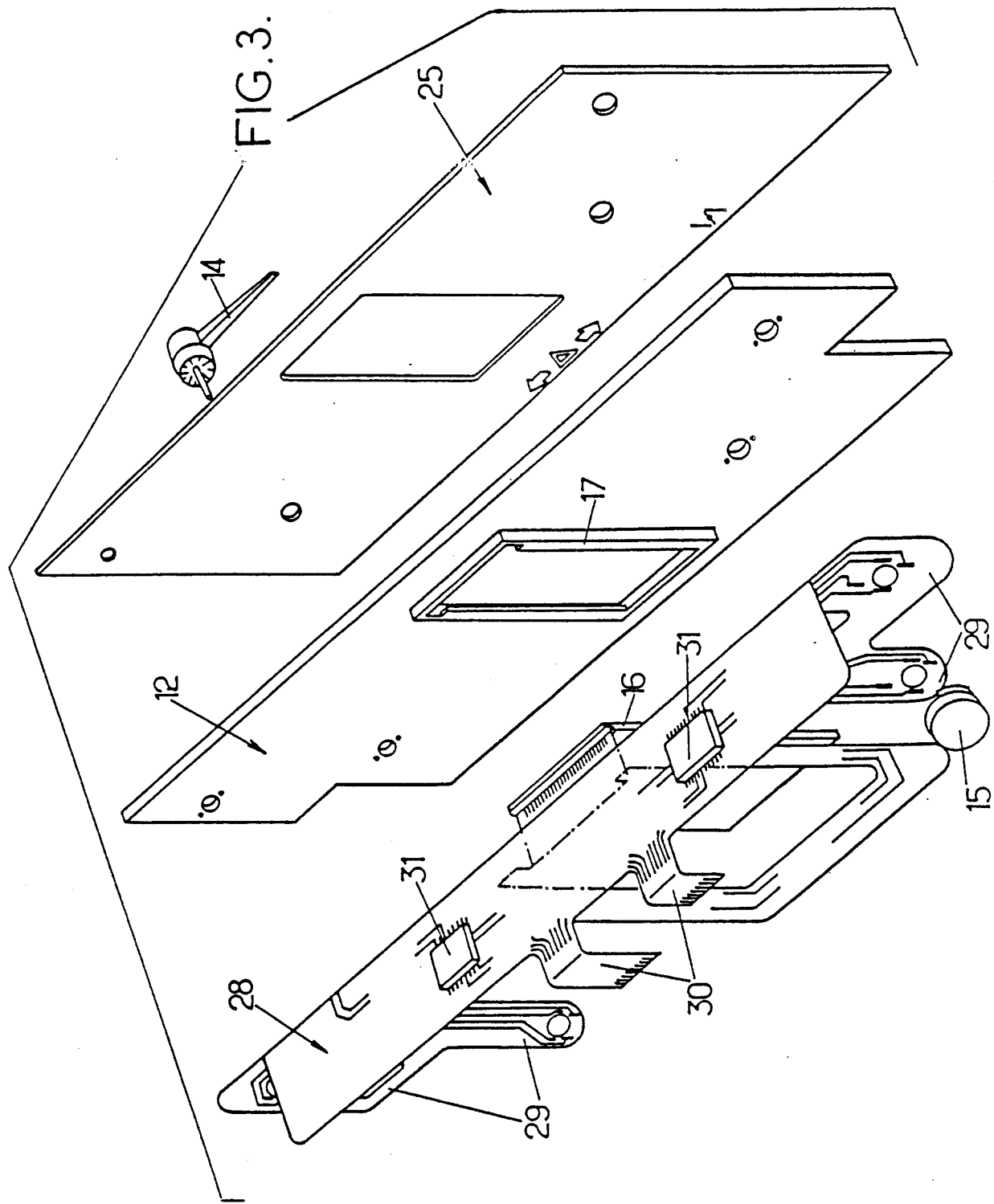

The invention will be better understood from the description of some of its embodiments given solely by way of illustrating examples. In this description, reference is made to the accompanying drawings in which:

FIG. 1 is an exploded perspective view of one dashboard arrangement in accordance with the invention, and FIGS. 2 and 3 are partial exploded perspective views showing respectively two variants of lay-out of the dashboard of FIG. 1.

Referring first of all to FIG. 1, the dashboard or dashboard portion, particularly for motor vehicles, laid out in accordance with the invention is architectured about a central case 1, e.g. parallelepipedic or approximately parallelepipedic, whose main face 2 turned towards the front (not visible in FIG. 1)—namely on the observer's side—is open, at least in its major portion and the inside of which is adapted so as to form a light box capable of diffusing an homogeneously distributed light towards the front. Such a light box may be arranged inside in any way known to a man skilled in the art. The main rear face of this case has a number of through openings for letting the light pass. In this connection, the purpose of openings 4 (disposed for instance in a longitudinal row) is to let pass the general lighting of the dashboard, which lighting is diffused homogeneously towards the front by the light box, whereas openings 5 (for example grouped together at the side edges and/or in the corners, such as the lower corners as shown in FIG. 1) are intended for letting pass the respective warning and/or function signalling lights. Preferably, case 1 will be adapted so as to ensure independence of the light paths passing through openings 5 with respect to the general lighting and further the mutual independence of the light paths passing through said openings 5 so as to avoid interference therebetween. To this end, openings 5 may extend over the whole thickness of the case and open on to its front face.

A rear plate 6, which is fixed to the main rear face 3 of case 1, supports the largest part of the components, particularly electric or electronic components (not shown), which are necessary for operation of the dashboard and whose presence is not indispensable on the front face. In particular, this rear plate 6 is provided with electric connectors 7 for providing removable electric connections between the dashboard and the rest of the vehicle, as well as electric connectors 8 providing connections between the rear plate and the front of the dashboard, as will be explained further on. Also, it will be noted that this rear plate 6 supports the whole of the lamps (not shown, only their bayonet mounts 9 being shown schematically) which are required for lighting the dashboard and for signalling purposes. These lamps may be engaged at least partially in the respective openings 4 and 5 of the central case 1. Generally, the rear plate 6 forms the support for the largest part of the components and, in order to facilitate manufacture and to simplify and make the connections between these components reliable, plate 6 is in the form of a rigid printed circuit board.

Protection of the rear of the dashboard is provided by a rear cover 10 fixed to the central case 1 and having all the openings 11 required for passage of the electric wires (not shown) for connection with the rest of the vehicle or required for the passage of adjusting tools, etc . . .

On the front face 2 of the central case 1 is fixed a rigid front plate 12 which is made from a translucent and preferably transparent material (such as polycarbonate) so as to let the light delivered by case 1 pass in the direction of the observer. This front plate 12 is further adapted so as to support a small number of components of the dashboard, namely those which are to be seen by the observer as well their direct control circuits where required (or the circuits of the last control stages). In particular, the front plate 12 is formed with holes 13 for passing therethrough the shafts of the indicator pointers 14 situated on the front face of plate 12 and whose electric drive motors 15 are fixed to the rear face of plate 12. Preferably, these motors are stepper motors (with which the appropriate control circuits are associated, generally transferred to the rear plate 6, or else to another position as will be explained further on) whose volume is much smaller than the galvanometric electric motors conventionally used in pointer indicating apparatus, so as to disturb to a minimum the passage of the light.

The front plate 12 is also equipped with all appropriate displays, for example a liquid crystal display 16 fixed in a recess 17 in the plate and having a connector 18 for electric connection.

With a view to simplifying the assembly of the dashboard and to reduce loose wiring to a minimum, the rear face of the front plate 12 is provided with printed electric connections 19 (for example, considering the nature of the material forming plate 12, they may be tracks made from silver deposited by silk-screen printing and an electrically conducting bonding agent deposited by silk-screen printing for fixing the components) connecting together the indicator members (pointer motors 15, display 16, . . . ), their direct control circuits 20, as well as connectors 21 (printed or added) for cooperating with interconnection members 22 providing the necessary electric connections between the rear plate 6 and the front plate 12. In the embodiment shown in FIG. 1, the interconnection members 22 are physically supported in appropriate through housings 23 provided in corresponding positions in case 1, for example in the thickness of a wall.

As shown in FIG. 1, the front plate 12 preferably has appropriate cut-outs 24 freeing the path of the warning and/or signalling lights, so as to avoid light interference with the general lighting. If required, the side edges of plate 12 may be made opaque (blackened) so as to avoid any lateral diffusion of the general lighting.

Finally, a facing plate 25 (thin plate or film) covers the front plate. This facing plate has selective transparency and, to this end, it is silk-screen printed to provide the front face pattern which is to be seen by the observer (dark opaque background zone, graduations and figures for the indicator pointers, transparent and coloured symbols for patterns for the warning and/or signalling lamps 26, totally transparent zone 27, possibly coloured, facing the display 16, etc . . . ).

A dashboard designed in accordance with the invention offers then the advantage of being formed of a reduced number of component elements which are easy to manufacture individually and easy to assemble on the central case 1 forming the main support element. The general lighting is designed so as to give an ambient light distributed as perfectly as possible so as to be able to light the patterns, the display(s), the pointers, . . . , whatever their positions of the front face. It is thus possible to modify the positions of the indicator members (displays, pointers)—with concomitant modification of the front plate 12 and of the facing plate 25— without having to modify the central case 1 and the rear plate 6.

Of course, it is possible to provide numerous variants of construction.

By way of example, FIG. 2 shows, in an exploded view and on a larger scale, solely the front portion of a variant of the dashboard of FIG. 1, only the elements situated in front of the central case being shown. In this figure, the same numerical references have been kept for designating the components or elements identical to those of FIG. 1. The front plate 12 and the facing plate 25 (shown in a more simplified form than in FIG. 1) remain physically identical to what they were in the embodiment of FIG. 1. On the other hand, the interconnection members 22 are here replaced by a flexible circuit 28 (for example of the Mylar type) which is provided with printed circuits ensuring all the desirable electric connections. Because of its very small thickness, this flexible circuit may not only provide the connections between the front plate 12 and the rear plate 6, but also be a substitute for the tracks 19 printed on the rear face of the front plate 12: in this case, the flexible circuit supports the electric or electronic components associated with the front plate 12 (motor 15, direct control components 20, . . . ) and provides their mutual connections.

Simply, the flexible circuit 28 passing through the central case 1 (not shown) for example is configured so as to have two zones or two series of zones respectively at the front 29 and at the rear 30 which have the appropriate electrically conducting terminals. Zones 29 and 30 are applied respectively against the front plate 12, on one side, and against the rear plate 6 on the other side, and the required electric connections are provided by simple contact.

The flexible circuit 28 may if required itself support components such for example as flat chip integrated circuits 31, such as shown in FIG. 3, even the liquid crystal display 16, or else even auxiliary printed circuit boards such as board 32 in FIG. 2.

As is evident and as it follows moreover already from what has gone before, the invention is in no wise limited to those of its modes of application and embodiments which have been more especially considered; it embraces, on the contrary, all variants thereof.

What is claimed is:

1. A dashboard assembly for primary components to be observed by a user and secondary components associated with the primary components, particularly for motor vehicles, comprising:
   a central case having side walls, a rear wall, and an open front face, and wherein a light means is provided for homogeneously diffusing light throughout the open front face so that said central case forms a light box,
   a front plate spanning the sides of said central case which is made of a transparent material and which is fixed to the open front face of said central case, said front plate including means for supporting completely the primary components to be observed by the user,
   a rear plate fixed on the rear wall of said central case, said rear plate including means for supporting the secondary components,
   electric connection means for providing electrical connections between the primary components mounted on the front plate and associated secondary components mounted on the rear plate, and
   a face plate which covers all of said front plate, said facing plate having selective transparency with zone of different colors.

2. A dashboard assembly according to claim 1, characterized in that the rear plate (6) is a printed circuit board.

3. A dashboard assembly according to claim 1, characterized in that the rear protection cover (10), which covers the rear plate, is fixed to the central case (1).

4. A dashboard assembly according to claim 1, characterized in that the light means for lighting the central case includes lamps which are supported by the rear plate (6), and corresponding openings (4) are formed in the rear face (3) of the central case so that light emitting portions of said lamps are situated in the central case.

5. A dashboard assembly according to claim 1, characterized in that signalling lamps are supported by the rear plate (6), and the rear wall (3) of the central case includes associated apertured extensions which extend to the opened front face and hence through the central case so that the light emitted by the signalling lamps is respectively transmitted by the associated apertured extension as far as the facing plate without interfering with each other and without interfering with the lighting diffused in the front face.

6. A dashboard assembly according to claim 1, characterized in that the transparent front plate (12) includes printed circuits (19) on its rear face.

7. A dashboard assembly according to claim 1, characterized in that at least one primary component includes a pointer indicator apparatus having a pointer (14) and an electric stepper motor (15) driving said pointer.

8. A dashboard assembly according to claim 1, characterized in that the selective transparency facing plate (25) with zones of different colours is silk-screen printed.

9. A dashboard assembly according to claim 1, characterized in that the electric connection means comprises electric connectors (22) passing through the central case.

10. A dashboard assembly according to claim 1, characterized in that the electric connection means comprises a flexible film (28) with printed tracks having at least two end zone (29, 30) applied respectively against the rear plate and against the front plate, the flexible printed track film being able to support other components.

* * * * *